Sept. 20, 1966  R. V. TETZ  3,274,483
PARALLEL RESISTANCE-CAPACITANCE VOLTAGE DIVIDER
Filed Oct. 29, 1962
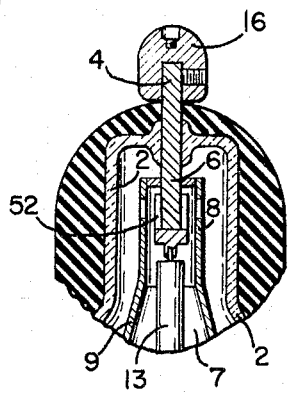
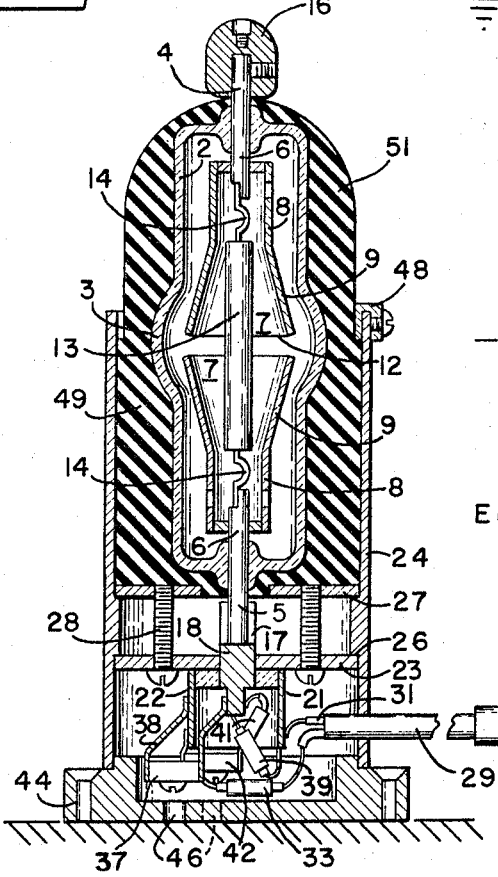
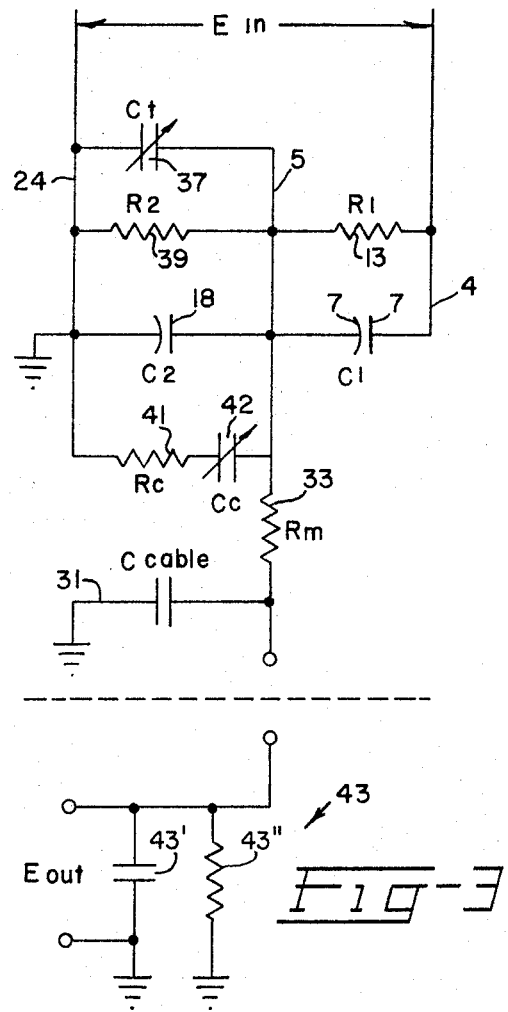
INVENTOR.
RONALD V. TETZ
BY
John J. Leavitt
AGENT United States Patent Office 3,274,483
Patented Sept. 20, 1966

3,274,483
PARALLEL RESISTANCE-CAPACITANCE VOLTAGE DIVIDER
Ronald V. Tetz, Los Gatos, Calif., assignor to Jennings Radio Manufacturing Corporation, San Jose, Calif., a corporation of Delaware
Filed Oct. 29, 1962, Ser. No. 233,762
11 Claims. (Cl. 323—74)

This invention relates to voltage dividers, and particularly to a parallel resistance-capacitance voltage divider.

The concept of a parallel resistance-capacitance voltage divider to measure D.C., pulse and RF signals is not a new one. Various voltage divider devices embodying this principle have been used for some time. One of the problems with voltage dividers of this type is the necessity of securing a proper cooperative relationship between the capacitor divider and the resistor divider so as to present to the circuit being measured a high impedance low inductance parallel resistance-capacitance. Failure in this respect results in the inability to secure accurate readings. It is therefore one of the objects of the invention to provide a parallel resistance-capacitance voltage divider in which the capacitance is sufficiently large to make the "turn-to-turn" capacitance and inductance of the resistance substantially insignificant.

Another object of the invention is to provide a voltage divider which will measure both high frequency A.C. and D.C. voltages with an accuracy within one percent.

Another object of the invention is the provision of a voltage divider capable of accurately measuring high voltage pulses in the order of 50,000 volts for instance, and having short rise times and long durations.

A still further object of the invention is the provision of a voltage divider incorporating in parallel a resistor divider to measure D.C. voltages in the order of 5 kv. and a capacitor divider to measure high frequency A.C. voltages to 50 kv. in the order of about 25 megacycles.

A still further object of the invention is the provision of a parallel resistance-capacitance voltage divider in which the effect of stray or environmental capacitance on the resistor is maintained at an extremely low value by surrounding the high voltage resistor with a high quality capacitor to keep the capacitance of the resistor at a negligible value.

Still another object of the invention is the provision of a parallel resistance-capacitance voltage divider useful to measure voltages from direct current to twenty-five megacycles without distortion above about one percent.

A still further object of the invention is the provision of a parallel resistance-capacitance voltage divider which incorporates division ratio adjustment to enable compensation for cable capacitance and measuring instrument capacitance.

Another object of the invention is the provision of a parallel resistance-capacitance voltage divider incorporating means protecting the operator and the measuring instrument in the event of an over-voltage.

Yet another object of the invention is the provision of a parallel resistance-capacitance voltage divider which minimizes input circuitry inductance.

A still further object of the invention is the provision of a parallel resistance-capacitance voltage divider in which the high voltage capacitor electrodes distribute the voltage uniformly across the high voltage resistor to prevent destruction of the resistor by high voltage gradients and arcing.

The invention possesses other objects and features of value, some of which, with the foregoing, will be apparent from the following description and the drawings. It is to be understood however that the invention is not limited to the showing made by the description and drawings, as it may be embodied in various forms within the scope of the appended claims.

Broadly considered, the parallel resistance-capacitance voltage divider of the invention comprises an evacuated envelope, preferably fabricated from a dielectric material such as glass or ceramic, and having extending in axial alignment into each opposite end a pair of metallic and electrically conductive leads. Supported about each lead in electrically conductive relation thereto is a high voltage capacitor shell or electrode arranged in mutually extending relation to the other capacitor electrode and spaced a short distance therefrom along a median plane extending transversely through the envelope. The capacitor electrodes conveniently are hollow copper shells and coaxially enclose a high voltage resistor having opposite terminals electrically connected to the adjacent ends of the conductive leads extending into the envelope. The unit so formed is electrically and detachably connected to a socket embodying a low voltage capacitor through which the device is electrically connected in circuit with the center conductor of a coaxial cable. The low voltage capacitor and socket are conveniently mounted on a suitable support plate within a housing extending partially about the evacuated envelope of the device. Suitable low voltage resistors and trimmer capacitors are provided for matching and compensating purposes. The end of the housing adjacent one of the conductive leads provides a convenient ground plane in close proximity to the high voltage terminal in order to minimize inductance problems. Suitable means are also provided to provide impact shock protection for the device.

Referring to the drawings:

FIG. 1 is a vertical half-sectional view taken through the axis of the envelope. Portions of the device are shown in elevation for clarity.

FIG. 2 is a fragmentary sectional view of a modified construction.

FIG. 3 is a circuit diagram illustrating the relationships of the parts of the parallel resistance-capacitance voltage divider, and the relationship of the voltage divider with the measuring instrument of oscilloscope with which it is intended that the voltage divider be used.

In terms of greater detail, the parallel resistance-capacitance voltage divider of the invention comprises an evacuated dielectric envelope 2, conveniently of glass and substantially symmetrical about a longitudinal axis, having a radially extending bulge 3 at about its midpoint and provided at opposite ends with inwardly extending electrically conductive leads or rods 4 and 5 conveniently of tungsten. Within the envelope each lead is provided with an extension 6.

Each of the electrically conductive leads is utilized to electrically connect and mechanically support a hollow metallic shell-like high voltage capacitor electrode 7 coaxially arranged with respect to the axis of the envelope and extending toward each other within the envelope to provide axially spaced associated ends lying in close proximity to a median plane extending transversely through the envelope. Each of the high voltage capacitor electrodes is provided with a relatively small diameter hollow cylindrical portion 8 brazed at one end to the associated lead extension 6 and merges at its other end with a hollow conically tapered portion 9 which terminates in a free, flared end 12 as shown. The configuration of the capacitor electrodes is significant in that it is a factor in maintaining a constant impedance match through the device and cooperates with related elements in a manner which will hereafter be explained.

Electrically connecting the extensions 6 of the opposed conductive leads is a resistor 13. This resistor is preferably of a high voltage conventional 100 megohm type, providing linear resistance between the electrodes for the voltage division desired. As shown in FIG. 1 of the drawing, in order to compensate for thermal expansion and contraction, the resistor is mounted on and is electrically connected to the conductive leads by expansible metallic and electrically conductive straps 14. In FIG. 2 the resistor is electrically connected to one of the conductive leads by a socket 52. As shown in the drawing the cylindrical portion 8 of shells 7 merge with the conical portion adjacent the end of the resistors. From this point the flare of the shell is proportional to the voltage gradient along the resistor.

A corona ball 16 is mounted on one of leads 4 as shown to provide the high voltage terminal. The other conductive lead 5 is utilized to detachably mount the voltage divider in a suitable base assembly including a resilient friction socket 17, fabricated preferably from copper, and constituting a portion of one low voltage electrode 18 of a low voltage capacitor designated generally by numeral 21. The other low voltage electrode 22 of the low voltage capacitor is electrically and mechanically connected to support plate 23 within cylindrical metallic housing 24 which is coaxially arranged about the evacuated envelope. Both the housing and support plate are conveniently formed of aluminum.

As shown in the drawing, the mounting or support plate is secured on a shoulder 26 formed on the inner periphery of the cylindrical housing, and is locked in place by lock plate 27 secured by screws 28. Adjacent the end of the cylindrical housing associated with the mounting plate, the housing is provided with an aperture through which is inserted a coaxial cable 29, conveniently of 50 ohms. The outer or ground conductor 31 of the coaxial cable is appropriately connected to the electrode 22 of the low voltage capacitor 21, which electrode is in turn electrically and mechanically connected to the housing which functions as a ground plane and shield.

The inner high voltage conductor 32, of the coaxial cable is connected to the electode 18 of the low voltage capacitor through resistor 33, which effectively compensates for any mismatch in the cable. Also connected to electrode 18 of the low voltage capacitor 21 is one terminal of a trimmer capacitor 37, the other terminal 38 of which is connected to ground through capacitor electrode 22 and the cylindrical housing. The trimmer capacitor functions to accurately adjust the voltage division ratio to 1000/1.

Also operatively interposed between the electrode 18 of low voltage capacitor 21 and the ground plane is a low voltage resistor 39. Another resistor 41, in series with another adjustable capacitor 42, is interposed between the low voltage capacitor electrode 18 and the ground plane for the purpose of compensating distortion caused by short rise time (high frequency) pulses. The inter-relationship of these capacitors and resistors will be better understood by reference to the circuit diagram illustrated in FIG. 3 in which like parts are correspondingly numbered.

As there shown, high voltage capacitor $C_1$, and high voltage resistor $R_1$, corresponding respectively to elements 7 and 13 in FIG. 1, are connected in parallel between the opposing electrically conductive leads 4 and 5. Connected in parallel between the latter high potential lead and ground plane 24 are adjustable trimmer capacitor $Ct$, low voltage resistor $R_2$, low voltage capacitor $C_2$, compensating resistor $R_c$ and adjustable compensating capacitor $C_c$, these elements corresponding respectively to elements 37, 39, 21, 41 and 42, the latter two elements being arranged in series with respect to each other and in parallel with respect to $Ct$, $R_2$, and $C_2$. Resistor $R_m$ functions to compensate for cable distortion caused by mismatch and corresponds to element 33 in FIG. 1. In other words, the resistor effectively terminates the coaxial cable into its characteristic impedance, typically 50 ohms. Cable 29 is utilized to connect the device to a measuring instrument or oscilloscope indicated generally by the numeral 43 in FIG. 3, which may conveniently include a capacitor 43' variable between 10 and 50 picofarads and a one (1) megohm resistor 43", all as conventionally found in oscilloscopes manufactured and sold by Tektronics, Inc., Hewlett-Packard or Fairchild.

The foregoing circuit elements are contained within the cylindrical housing between the plate 23 and a base 44 attached to the open end of the cylindrical housing 24. Suitable means such as crews (not shown) are provided to secure the unit to a supporting structure, and apertures 46 in the base permit access for adjustment of capacitors 37 and 42.

As shown in FIG. 1, the cylindrical housing provides an adequate ground and shield, and permits mounting of a suitable ground connector 48 on the upper open end thereof. To protect the evacuated dielectric envelope from impact shocks and other interference, the space within the cylindrical wall is filled with a suitable silicon rubber filler 49 provided with an extending portion 51 surrounding and encapsulating the entire envelope. The parts are preferably proportioned so that in the event of an overvoltage, the device will break down externally between the corona ball and the ground connection 48, thereby providing suitable protection for the operator and any measuring instrument connected to the voltage divider.

I claim:

1. A voltage divider circuit having high and low voltage terminals and comprising an alternating current circuit connected between said high and low voltage terminals, a direct current circuit connected between said high and low voltage terminals, a ground plane forming a terminus for both said alternating and direct current circuits, a high voltage capacitor interposed in the alternating current circuit between the high and low voltage terminals, a high voltage resistor interposed in the direct current circuit between the high and low voltage terminals in parallel with the high voltage capacitor, the relationship of said high voltage capacitor and high voltage resistor being such that the potential gradient generated by the capacitor is distributed across the length of the resistor in a non-destructive pattern, a low voltage capacitor interposed between the paralleled high voltage capacitor resistor and the ground plane, and a low voltage resistor interposed between the paralleled high voltage capacitor-resistor and the ground plane in parallel with the low voltage capacitor.

2. The circuit according to claim 1, in which a trimmer capacitor is interposed between the paralleled high voltage capacitor-resistor and the ground plane in parallel with the low voltage capacitor-resistor to enable selected variation of the division ratio between the high and low voltage terminals.

3. The circuit according to claim 1, in which a serially arranged resistor and capacitor are interposed between the paralleled high voltage capacitor-resistor and the ground plane in parallel with the low voltage capacitor-resistor to compensate for distortion caused by high frequency pulses.

4. The circuit according to claim 1, in which a resistor is serially interposed in the direct current circuit between the high voltage resistor and the low voltage terminal to compensate for mismatch of the characteristic impedance of the circuit.

5. The circuit according to claim 2, in which a serially arranged resistor and capacitor are interposed between the paralleled high voltage capacitor-resistor and the ground plane in parallel with the trimmer capacitor and the low voltage capacitor-resistor to compensate for distortion caused by high frequency pulses.

6. The circuit according to claim 5, in which a resistor is serially interposed in the direct current circuit between the high voltage resistor and the low voltage terminal to compensate for mismatch of the characteristic impedance of the circuit.

7. A parallel resistance-capacitance voltage divider comprising:
   (a) an envelope including a pair of terminal leads extending into the envelope and having their inner ends spaced apart,
   (b) an electrically resistive element conductively connecting the spaced apart inner ends of said terminal leads,
   (c) a pair of capacitor electrodes supported within the envelope and electrically connected to the terminal leads in parallel with the resistive element, said capacitor electrodes including flared portions surrounding opposite ends of the resistive element with the degree of flare being proportioned to the voltage gradient along the resistive element, and
   (d) connection means to electrically connect one of the terminal leads to an associated voltage measuring device.

8. A parallel resistance-capacitance voltage divider comprising:
   (a) an envelope including a pair of terminal leads extending into the envelope and having their inner ends spaced apart,
   (b) an electrically resistive element conductively connecting the spaced apart inner ends of said terminal leads,
   (c) a pair of opposed capacitor electrodes supported within the envelope and electrically connected to the terminal leads in parallel with the resistive element,
   (d) electrically conductive shield means constituting a ground plane surrounding a portion of the envelope in spaced relation thereabout,
   (e) an impact shock absorbent material encapsulating the envelope and filling the space between the envelope and the shield, and
   (f) connection means to electrically connect one of the terminal leads to an associated measuring device.

9. A parallel resistance-capacitance voltage divider comprising:
   (a) an envelope including a pair of terminal leads extending into the envelope and having their inner ends spaced apart,
   (b) an electrically resistive element conductively connecting the spaced apart inner ends of said terminal leads,
   (c) a pair of opposed capacitor electrodes supported within the envelope and electrically connected to the terminal leads in parallel with the resistive element, and
   (d) connection means including a low voltage capacitor to electrically connect one of the terminal leads to an associated measuring device.

10. A parallel resistance-capacitance voltage divider comprising:
    (a) an envelope including a pair of terminal leads extending into the envelope and having their inner ends spaced apart,
    (b) an electrically resistive element conductively connecting the spaced apart inner ends of said terminal leads,
    (c) a pair of opposed capacitor electrodes supported within the envelope and electrically connected to the terminal leads in parallel with the resistive element, and
    (d) connection means to electrically connect one of the terminal leads to an associated voltage measuring device, said connection means including means to accurately adjust the division ratio of the divider.

11. A parallel resistance-capacitance voltage divider comprising:
    (a) an envelope including a pair of terminal leads extending into the envelope and having their inner ends spaced apart,
    (b) an electrically resistive element conductively connecting the spaced apart inner ends of said terminal leads,
    (c) a pair of opposed capacitor electrodes supported within the envelope and electrically connected to the terminal leads in parallel with the resistive element, and
    (d) connection means to electrically connect one of the terminal leads to an associated voltage measuring device, said connection means including means for compensating distortion caused by high frequency electrical pulses.

References Cited by the Examiner

UNITED STATES PATENTS

| | | | |
|---|---|---|---|
| 704,023 | 7/1902 | Fritts | 317—256 |
| 1,808,031 | 6/1931 | Fried | 317—242 |
| 2,386,651 | 10/1945 | Bisson | 323—93 |
| 2,405,515 | 8/1946 | Neyzi | 317—256 |
| 2,640,940 | 6/1953 | Bennett | 317—256 |
| 2,828,396 | 3/1958 | Forman et al. | 338—234 |
| 2,847,640 | 8/1958 | Pihl | 323—74 |
| 2,944,198 | 7/1960 | Louys | 317—242 |
| 2,954,518 | 9/1960 | Dugot | 323—74 |
| 3,005,148 | 10/1961 | Salomonsson | 323—74 |
| 3,101,443 | 8/1963 | Fried | 317—256 |

JOHN F. COUCH, *Primary Examiner.*

LLOYD McCOLLUM, *Examiner.*

D. L. RAE, A. D. PELLINEN, *Assistant Examiners.*

UNITED STATES PATENT OFFICE
CERTIFICATE OF CORRECTION

Patent No. 3,274,483　　　　　　　　　　　　　　September 20, 1966

Ronald V. Tetz

It is hereby certified that error appears in the above numbered patent requiring correction and that the said Letters Patent should read as corrected below.

Column 1, line 26, for "resistance" read -- resistor --; column 2, line 42, for "of" read -- or --; column 3, line 11, for "resistors" read -- resistor --; column 4, line 10, for "crews" read -- screws --.

Signed and sealed this 22nd day of August 1967.

(SEAL)
Attest:

ERNEST W. SWIDER　　　　　　　　　　　　　　EDWARD J. BRENNER
Attesting Officer　　　　　　　　　　　　　　Commissioner of Patents